3,790,446
CYTOPHAGA ISOAMYLASE
Zeenat Gunja-Smith, Miami, Fla., assignor to Research Corporation, New York, N.Y.
No Drawing. Filed Oct. 7, 1971, Ser. No. 187,318
Int. Cl. C12d 7/02
U.S. Cl. 195—66 R       10 Claims

ABSTRACT OF THE DISCLOSURE

Isoamylase enzyme which will debranch polysaccharides having $\alpha\text{-}1\rightarrow6$-linked branches, for example glycogen and amylopectin, is recovered from an enzyme system derived from a species of the genus Cytophaga deposited in the National Collection of Industrial Bacteria in Aberdeen, Scotland, under number NCIB 9497. This Cytophaga isoamylase has the following identifying characteristics:

(a) an optimum activity pH of 5.5;
(b) a molecular weight of the order of 120,000;
(c) an isoelectric point between 5.0 and 5.5;
(d) inactivation by ethylenediamine tetraacetate;
(e) non-inactivation by tris-2-amino-2-hydroxymethyl-1,3-propanediol or p-CMB (p-chloromercuribenzoate).

---

This invention relates to a glycogen debranching enzyme produced from a species of Cytophaga.

U.S. Pat. No. 3,330,738, the disclosures of which are incorporated herein and made part of this disclosure, describes a method for the production of an enzyme system from a species of the genus Cytophaga which has been deposited in the National Collection of Industrial Bacteria, Aberdeen, Scotland, under the number NCIB 9497. The enzyme system obtained from Cytophaga NCIB 9497 has been designated "L1 Enzyme." This enzyme system contains valuable proteolytic enzymes and has previously been considered principally as a proteolytic agent. It has now been found that the L1 enzyme complex contains an isoamylase enzyme which will debranch polysaccharides having $\alpha\text{-}1\rightarrow6$-linked branches, for example glycogen and amylopectin. This enzyme is referred to hereinafter as Cytophaga isoamylase and has the following identifying characteristics:

(a) an optimum activity pH of 5.5;
(b) a molecular weight of the order of 120,000;
(c) an isoelectric point between 5.0 and 5.5;
(d) inactivation by ethylenediamine tetraacetate;
(e) non-inactivation by tris-2-amino-2-hydroxymethyl-1,3-propanediol or p-CMB (p-chloromercuribenzoate).

Other characteristics of the partially purified enzyme preparation are described hereinafter.

Cytophaga isoamylase may be at least partially separated from other materials in the L1 enzyme complex by fractionation and selection of those fractions showing significant activity. A combination of ammonium sulphate fractionation, acetone fractionation and DEAE-cellulose column chromatography has proved especially effective.

The crude L1-enzyme preparation may be prepared by culturing the organism Cytophaga NCIB 9497 or an isoamylase producing mutant thereof on a nutrient medium therefor under aerobic conditions.

The culture may be carried out by methods well-known in the fermentation industry preferably by submerged aerobic fermentation.

A wide variety of media may be used of types commonly used in the culture of micro-organisms. Such media essentially comprise a source of nitrogen, supplemented as necessary by carbohydrate and/or nutrient salts. Among the sources of nitrogen which have proved satisfactory are malt extract, meat extract, peptone and corn steep liquor alone or in admixture with one another. Particularly useful nitrogen sources however include fungal mycelium, such as mycelium of the genera Cephalosporium and Penicillium. It is thus possible to use as a nitrogen source waste mycelial residues from the production of antibiotics, which represent a comparatively cheap source of material.

As will be appreciated the nitrogen source may frequently supply the carbon and/or nutrient salts requirements of the organism without supplementation, and for example the organism will grow satisfactorily on a medium composed only of meet extract and peptone also containing sodium chloride. Supplementation by carbohydrate may however be required in some cases, suitable carbohydrates for this purpose including sucrose, maltose, glucose etc. Trace minerals which may be required include magnesium, iron and zinc. The pH of the medium before sterilization is conveniently between 5.0 and 8.0, preferably between 5.5 and 6.0.

The culture is conducted at a temperature between 20 and 30° C. and preferably between 22 and 32° C., a temperature of around 26° C. being about the optimum. Convient culture times are from 20 to 50 hours.

The culture liquid is then subjected to fractionation to separate the desired isoamylase from other proteinaceous components. A variety of fractionation procedures can be used; in each case the fractions obtained can be tested for isoamylase activity and only the active fractions selected. In this way, substantial purification can be effected and material having a single enzymic activity, namely glycogen debranching, can be isolated. However, less pure material may well be useful in applications where contamination by, for example, proteolytic enzymes may not be significant, e.g. in starch degradation.

The crude culture media can, after removal of cells, e.g. by centrifugation, be treated with an inorganic salt protein precipitant such as ammonium sulphate, and/or an organic precipitant such as acetone to precipitate the isomylase while leaving some unwanted material in solution.

Treatment with acetone or related water-miscible precipitants serves to precipitate the enzyme while leaving most of the polysaccharide content in solution. Acetone precipitates most of the isoamylase in the concentration range 50–80%.

Any residual precipitant in the enzyme preparation can be removed by dialysis.

The crude or partially purified L1 enzyme preparation may be subjected to chromatography on a weakly basic ion exchange resin, for example diethylaminoethyl (DEAE) cellulose or DEAE Sephadex (a dextran gel cross-linked with ethylene oxide and carrying DEAE groupings). By adjusting pH values and ionic strengths, many proteins in the preparation are held on the resin and can in this way be removed.

Thus, for example, column chromatography on DEAE cellulose at pH 8.0 using 0.005 M or 0.025 M citrate-phosphate buffer effected approximately 2 to 5-fold purification and this treatment preceded by acetone precipitation in the concentration range 50–80% gave an overall purifiication of the culture fluid of over 10-fold. Similarly, the isoamylase is not adsorbed on weakly acidic ion exchange resins such as carboxymethyl (CM) cellulose at certain pH values and ion strengths e.g. using 50 mM. acetate buffer at pH 5.0.

The enzyme is relatively stable in solution and dialyzed solutions have been stored for several days at 4° C. without significant loss of activity.

As indicated above, the new Cytophaga isoamylase according to the invention has the property of debranching amylopectin, glycogen and related α-1→4-linked polysaccharides having α-1→6-linked branches and interchain linkages. The enzyme pullulanase has previously shown similiar capability with respect to amylopectin but is unable to effect total debranching of undegraded glycogen. These properties render the new enzyme of great use in the determination of the fine structure of polysaccharides having α-1→6-linked branches and for laboratory investigation alone a considerable commercial market exists.

Furthermore, there is a high demand for starches having a high amylose content whereas most natural starches contain about 50% amylopectin. The new enzyme can effectively convert virtually all of the amylopectin in natural starch to amylose thereby increasing its commercial value. It is even possible to prepare, in this way, virtually totally unbranched polysaccharides which can be moulded or extruded into clear films. Such films are, of course, edible and can be used in packaging food preparations such as sausages in place of the non-edible films which are used at the present time.

The new enzyme is also of use in the quality control of starch in the production thereof and in starch degradation processes. Furthermore, by attacking the α-1→6-linkages, the enzyme can, in conjunction with other enzymes such as β-amylase and amyloglucosidase, degrade starch rapidly and substantially completely; the rapidity of the reaction in going to completion substantially eliminates retrogradation. In view of the relatively small number of α-1→6-linkages, use of the enzyme alone can effect a partial degradation of starch which will stop automatically when all the α-1→6-linkages have been broken, without necessitating denaturation of the enzyme to prevent further attack as in the case when β-amylase is used for limited degradation. Furthermore, the desired properties of dextrins intended for different applications depends in part on the branch chains which are present. By removing a predetermined proportion of such branches, the properties of the dextrin can be adjusted to meet particular requirements.

The debranching action of Cytophaga isoamylase on various substrates is shown in Table I.

TABLE I

Action of isoamylase on poly- and oligosaccharides

| Substrate | Glucosidic bonds— | | |
|---|---|---|---|
| | Hydrolyzed by isoamylase (percent) | Subsequently hydrolyzed by pullulanase (percent) | Degree of β-amylolysis after isoamylase action (percent) |
| Phytoglycogen | 8.7 | 0 | 109 |
| Shellfish glycogen | 9.45 | 0 | 108 |
| Shellfish glycogen β-dextrin | 12.7 | 3.8 | 78 |
| Shellfish glycogen φ-dextrin | 12.3 | 0 | 100 |
| Amylopectin | 5.1 | 0 | 106 |
| Amylopectin β-dextrin | 9.3 | 2.2 | 70 |
| Amylopectin φ-dextrin | 9.4 | 0 | 102 |
| Pullulan | 1.8 | 29 | 9.5 |
| α-limit dextrins | 6.7 | 10.7 | 81 |

Substrates (5 mg./ml.) were incubated with purified isoamylase (0.15 u./ml.) under the conditions described in the examples. Samples (0.2 ml.) were removed after 18 hours for measurement of reducing power, the remainder of the digest being heated at 100° for 3 min. A sample of the heated digest (0.2 ml.) was treated with pullulanase (0.1 ml., 0.5 unit) for 1 hour at 37° C. and the increase in reducing power measured. A second sample (0.4 ml.) was treated with β-amylase (0.1 ml., 500 u./ml.) for 24 hours at 37°. The reducing power was then measured.

Treatment of shellfish glycogen and amylopectin for 24 hours with debranching enzyme resulting in a striking increase in iodine-staining power which was accompanied by only a small shift in $E_{max}$. (470 nm.→490 nm.; 530 nm.→545 nm. Chromatography of the glycogen reaction mixtures revealed the production of a series of oligosaccharides that were completely degraded to maltose and glucose by the action of β-amylase. Reducing power measurements confirmed that the successive actions of debranching enzyme and β-amylase had resulted in a 95% conversion of the glycogen to maltose and glucose. In each case the reaction was virtually complete after 21 hours with essentially no further change in iodine stain or copper reducing power after 42 hours. The final extents of hydrolysis observed for the glycogens of shellfish, liver and sweet corn correspond to average chain lengths of 10.2, 12.3 and 10.0 in that order. These are consistent with the chain lengths reported and determined by other methods. Chromatography of the final products again reveal a series of oligosaccharides. A small amount of glucose was also detected in the products but estimation by glucose oxidase showed that less than 0.4% of the total carbohydrate was released as glucose after 21 hours incubation. This indicates that the debranching enzyme preparation is essentially free of α-glucosidase activity.

The effect of pH on the glycogen debranching reaction is such that above 4.8 the pH of the reaction is not critical but there is a marked loss of enzyme activity at lower pH values. Unless otherwise stated, all the other incubations of the Cytophaga enzyme indicated herein were therefore made at pH 5.5. Incubation for 5 minutes at 50° resulted in a loss of more than 70% of the debranching activity.

It can be seen from Table I that the enzyme does not act on pullulan and has a very slow action on α-limit dextrins. A rapid hydrolysis was observed to take place in the initial stages of the incubation (1 hour) indicating that the α-dextrin mixture contains a small proportion of molecules highly susceptible to the debranching of the enzyme.

The action of the enzyme on amylopectin and glycogen is virtually complete within 24 hours of incubation but a continued slow hydrolysis of the limit dextrins of glycogen and amylopectin is evident from the further release of reducing sugars between 24 and 48 hours. The almost complete conversion to maltose by β-amylase portions of the glycogen, phosphorylase limit dextrin and amylopectin digests after 48 hours of debranching (see Table I) indicates that most of the branching points in these molecules have been cleaved. The limited β-amylolysis of the β-dextrins after the same treatment suggests the presence of branching points that are resistant to the action of the Cytophaga enzyme. This is confirmed by the further increase in reducing power that resulted when the debranched β-dextrins were treated with pullulanase (see Table I). As expected, there was little increase in reducing power of the almost completely debranched products of amylopectin, glycogen and its phosphorylase dextrin, but pullulan and the α-limit dextrins were rapidly hydrolyzed. Chromatography of the products of glycogen β-dextrin after treatment with pullulanase or Cytophaga debranching enzyme to give the same extent of debranching (75%), revealed that, whereas about equal proportions of maltotriose and maltose are released by pullulanase, maltotriose is released from the dextrin by the Cytophaga enzyme in much greater amounts than maltose which is barely detectable. The interchain linkages carrying the maltose side chains of the β-dextrin therefore must be resistant to the action of the Cytophaga debranching enzyme although they are readily hydrolyzed by pullulanase.

The following examples illustrate the purification of Cytophaga isoamylase and its characterization.

(1) PURIFICATION OF ISOAMYLASE 1250 mg. of L1 enzyme preparation produced by the method of Example 6 of U.S. Pat. No. 3,330,738 with dialysis to remove ammonium sulphate was dissolved in 50 ml. water and centrifuged at 20,000 r.p.m. to remove insoluble material. 40 ml. of the clear supernatant solution was then fractionated with cold acetone, two fractions being collected (0–50% and 50–80%). Each precipitate was collected by centrifugation, dissolved in 10 ml. of 0.1 M citrate-phosphate buffer pH 6.9, then dialyzed overnight against this buffer.

| Fraction | Acetone concentration, percent | Volume (ml.) | Activity (Iu./ml.) | Total units | Percent |
|---|---|---|---|---|---|
| Initial supernatant | | 40 | 0.132 | 5.27 | 100 |
| F1 | 0–50 | 11.6 | 0.184 | 2.13 | 40.4 |
| F2 | 50.80 | 14.7 | 0.155 | 2.29 | 43.5 |

NOTE.—Total recovery = 83.9%.

Fraction 2 (103 ml. = 1.65 units) was dialyzed against 0.025 M citrate-phosphate buffer pH 8.0 and applied to a column (6.5 x 1.5 cm.) of DEAE-cellulose. Elution was carired out with a gradient of 0–0.5 M NaCl in this buffer over 100 ml., fractions of 5.2 ml. being collected.

Volume _____ ml__ 20.8
Activity _____ u./ml__ 0.056
Total units recovered _____ 1.17
Recovcery from DEAE-cellulose _____ 71
Total overall recovery _____ percent__ 31

Protein content and specific activities:

| Solution | Protein (mg./ml.) | Activity (u./ml.) | Specific activity (u./mg.) |
|---|---|---|---|
| Initial supernatant | 5.6 | 0.132 | 0.023 |
| F1 | 7.5 | 0.184 | 0.024 |
| F2 | 2.0 | 0.155 | 0.077 |

Analysis for polysaccharide:

| Solution | Polysaccharide (as glucose, mg./ml.) | Volume (ml.) | Total polysaccharide (mg.) |
|---|---|---|---|
| Initial supernatant | 3.15 | 40 | 126.0 |
| F1 | 8.30 | 11.6 | 96.0 |
| F2 | 0.28 | 14.7 | 4.0 | i.e. acetone fractionation results in a fraction (F2) virtually free from polysaccharide.

This fraction was tested for protease activity, which was found to be present, but at a considerably lower level than in the initial solution.

(2) STABILITY AND ACTIVITY OF THE ENZYME PREPARATION AT VARIOUS pH VALUES pH/activity determinations were carried out by incubating digests consisting of: 0.25 ml. enzyme preparation, 0.25 ml. citrate-phosphate buffer of various pH values and 1.0 ml. substrate solution (shellfiesh glycogen 10 mg./ml.) at 30° C. for 1.5 hours. Samples (0.5 ml.) were then removed for determination of reducing power.

pH/stability determinations were carried out by preincubating at room temperature 0.25 ml. enzyme preparation and 0.25 ml. citrate-phosphate buffer of various pH values. After 2 hours 1.0 ml. of substrate solution was added, then the residual activity determined as above.

| pH | Activity (as percent of maximum) | Activity remaining [1] |
|---|---|---|
| 3.24 | 3.7 | |
| 3.60 | 9.1 | |
| 3.90 | 19.5 | |
| 4.40 | 80.0 | 20 |
| 4.81 | 94.5 | 72 |
| 5.44 | 100.0 | 84 |
| 6.13 | 99.8 | 85 |
| 7.11 | 91.0 | 93 |
| 8.70 | 65.0 | 96.5 |

[1] After 2 hours preincubation at room temperature at that pH (as percent of activity measured without preincubation)

(3) STABILITY OF ENZYME PREPARATION ON STORAGE

The dialyzed solution was stored in the refrigerator and samples removed at intervals for activity determinations. The activity was also determined in a solution which had been made 10 mM. with respect to Clelands reagent to see whether this stabilized the enzyme.

| Number of days stored | Without Clelands reagent | | With Clelands reagent | |
|---|---|---|---|---|
| | Activity (u./ml.) | Activity remaining, percent | Activity (u./ml.) | Activity remaining, percent |
| 0 | 0.040 | 100 | | |
| 1 | 0.038 | 95 | 0.044 | 110 |
| 3 | 0.037 | 92.5 | 0.033 | 82.5 |
| 9 | 0.041 | 102 | 0.032 | 80 |
| 12 | 0.039 | 97 | | |

The enzyme is therefore apparently stable when stored in the refrigerator. Clelands reagent does not seem to be necessary.

For temperature/activity determination, digests consisting of 0.2 ml. enzyme solution, 0.3 ml. buffer (50 mM. acetate pH 5.5) and 0.5 ml. glycogen solution (10 mg./ml.) were incubated at 30, 35, 40 and 50° C. After incubation for 1 hour 0.5 ml. samples were removed for reducing power determination.

For temperature stability determination, digests consisting of 0.2 ml. enzyme solution and 0.3 ml. buffer 50 mM. acetate pH 5.5) were preincubated at 30° and 40° C. for 1 hour then 0.5 ml. glycogen solution (10 mg./ml.) added. Incubated at that temperature for a further 1 hour, then samples (0.5 ml.) removed for reducing power determination.

(4) TEMPERATURE OPTIMUM AND STABILITY

Temperature          Apparent activity (U/ml.)
30 _____ 0.033
34 _____ 0.046
40 _____ 0.056
50 _____ 0.028

| Temperature | Apparent activity after 1 hour at that temperature | Activity remaining (percent) |
|---|---|---|
| 30 | 0.028 | 85 |
| 40 | 0.002 | 4 |

Clearly the apparent activity is highest at about 40° C. However the enzyme appears to be highly unstable at this temperature in the absence of substrate.

(5) TEST FOR POSSIBLE ENZYME INHIBITORS

Digests were prepared containing enzyme solution (0.2 ml.), substrate solution (shellfish glycogen 10 mg./ml., 0.5 ml.) together with (a) No additive (control);
(b) EDTA (final concentration 10 mM.);
(c) Tris (final concentration 50 mM., adjusted to pH 5.5 with acetic acid);
(d) p-CMB (final concentration $10^{-5}$ M).

The effect of these various additives on the activity was determined by iodine staining measurements.

Additive:                                Loss of activity (percent)
EDTA, 10 mM. _____ 72
p-CMB, $10^{-5}$ M _____ 0
Tris, 50 m. _____ 0

(6) DISC-GEL ELECTROPHORESIS

Electrophoresis using "standard" Canalco reagents which contain tris buffer pH 8.4 showed a major slow moving protein band with a number of minor faster moving bands. The activity could not be recovered from the gel.

Electrophoresis was then carried out in phosphate buffer pH 7.5. 0.25 ml. of dialyzed enzyme solution was freeze-dried, redissolved in 0.05 ml. water, and applied to the gels. The protein was detected with Coomassie blue after electrophoresis was completed and showed a broad band together with two narrower more intense bands.

The second gel was cut into 21 pieces using a scalpel and each fraction incubated for 11 hours with 0.2 ml. glycogen substrate solution and 0.2 ml. 50 mM. acetate buffer pH 5.5, then stained with iodine reagent (4.5 ml.).

It appeared that the enzymic activity was not associated with the major protein band but rather the more slowly moving one.

(7) SUCROSE DENSITY-GRADIENT CENTRIFUGATION

Gradients of 5–20% sucrose in 0.1 M citrate-phosphate buffer pH 7.5 were prepared in 5 ml. centrifuge tubes containing a total volume of 4.6 ml.

7.5 ml. of the enzyme solution was freeze-dried; redissolved in 0.4 ml. 0.1 citrate-phosphate buffer pH 7.5. 0.1 ml. of this solution was layered onto the top of one sucrose gradient and centrifuged at 39,000 r.p.m. in the SW 39 head of a Beckman ultracentrifuge. Two other tubes were run as controls, one containing glucoamylase 1 (*A. niger*), and the other containing lysozyme and phosphorylase *b*.

After centrifugation for 18 hours, the bottoms of the tubes were pierced and fractions of 5 drops collected (37 fractions). They were assayed for protein (Lowry) and activity in the tube containing isoamylase and were assayed for glucoamylase activity using soluble starch as substrate. Phosphorylase activity was measured by increase in iodine staining power in digests containing glucose-1-phosphate and glycogen as primer. Lysozyme was determined by Lowry protein measurements.

The isoamylase sedimented slightly faster than glucoamylase. Using a molecular weight of 110,000 for this latter enzyme, this indicates a molecular weight of the order of 120,000 for the isoamylase. It was seen that the activity did not coincide with a major protein peak showing that the enzyme preparation is contaminated with a considerable amount of other protein. Specific activity of fraction 17 was 1.1 u./mg.

(8) GEL ELECTROFOCUSSING

Electrofocussing was carried out in polyacrylamide gels containing LKB ampholyte (pH range 3–10). 250 µg. of the enzyme preparation was mixed with the gel monomer, then chemically polymerized in 38 mm. tubes. The electrofocussing was carried out at 2° C. overnight under a potential of 350 volts; after which time the current had dropped almost to zero.

Protein was detected in one gel by staining with Coomassie blue. Several bands of protein were seen confirming that the preparation is impure.

Another gel was cut into 1 mm. sections using a scalpel and each piece extracted with water (0.5 ml.) for 2 hours, after which time the pH was determined. Isoamylase activity was then determined by incubating the solution with shellfish glycogen (0.2 ml., 10 mg./ml.) and acetate buffer at 30° C. overnight.

The isoelectric point was found to be between 5.0 and 5.5. It should be noted that any protein or activity above pH 7.7 would not have been detected by this method.

What is claimed is:

1. A method of producing isoamylase which comprises culturing the microorganism Cytophaga NCIB 9497, and subjecting the resulting culture medium to fractionation to separate therefrom a fraction comprising predominantly isoamylase enzyme.

2. A method in accordance with claim 1 wherein the fractionation of the culture, medium for the recovery of isoamylase includes precipitation with a protein precipitant.

3. A method in accordance with claim 1 wheren the separation of isoamylase from the culture medium includes precipitation with a protein precipitant selected from the group consistng of acetone and ammonium sulphate.

4. A method in accordance with claim 1 wherein the fractionation of the culture medium includes column chromatography.

5. A method in accordance with claim 1 wherein the separation of the isoamylase from the culture medium includes precipitation with a protein preciptant and column chromatography employing DEAE-cellulose or DEAE Sephadex.

6. A method of debranching a polysaccharide having $\alpha$-1$\rightarrow$6-linked branches which comprises bringing the polysaccharide into contact with isoamylase derived by culturing the microorganism Cytophaga NCIB 9497 and effecting reaction between said polysaccharide and said isoamylase to debranch said $\alpha$-1$\rightarrow$6-linked branches from said polysaccharide.

7. A method in accordance with claim 6 wherein the polysaccharide is glycogen.

8. A method in accordance with claim 6 wherein the polysaccharide is amylopectin.

9. A method of converting amylopectin in natural starches and the like into amylose which comprises bringing amylopectin-containing starches and the like into contact with isoamylase derived by culturing the microorganism Cytophaga NCIB 9497 and effecting reaction between said amylopectin-containing starches and the like and said isoamylase to convert the amylopectin into amylose.

10. Isoamylase enzyme capable of debranching amylopectin, glycogen and related $\alpha$-1$\rightarrow$4-linked polysaccharides having $\alpha$-1$\rightarrow$6-linked branches and interchain linkages derived from the microorganism Cytophaga NCIB 9497 or an isoamylase producing mutant thereof.

References Cited

UNITED STATES PATENTS

| | | | |
|---|---|---|---|
| 3,556,942 | 1/1971 | Hathaway | 195—31 R |
| 3,362,475 | 1/1972 | Sugimoto et al. | 195—31 R |
| 3,330,738 | 7/1967 | Napier | 195—66 |
| 3,560,345 | 2/1971 | Yokobayashi et al. | 195—66 R |

OTHER REFERENCES

Yokobayashi et al.: Agr. Biol. Chem., vol. 33, No. 4, pp. 625–627.

Lee et al.: The Enzymes, vol. 5, 3rd ed. (1971), pp. 192–234.

A. LOUIS MONACELL, Primary Examiner

T. G. WISEMAN, Assistant Examiner

U.S. Cl. X.R.

195—31 R, 65